United States Patent
Rosenkranz et al.

(10) Patent No.: US 10,202,998 B2
(45) Date of Patent: Feb. 12, 2019

(54) ANCHOR WITH AN EXPANSION SECTION AND A CUTTING THREAD

(71) Applicant: Hilti Aktiengesellschaft, Schaan (LI)

(72) Inventors: Falk Rosenkranz, Wildhaus (CH); Michael Beckert, Diepoldsau (CH); Christoph Hakenholt, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 442 days.

(21) Appl. No.: 14/783,357

(22) PCT Filed: Apr. 2, 2014

(86) PCT No.: PCT/EP2014/056573
§ 371 (c)(1),
(2) Date: Oct. 8, 2015

(87) PCT Pub. No.: WO2014/166787
PCT Pub. Date: Oct. 16, 2014

(65) Prior Publication Data
US 2016/0053792 A1    Feb. 25, 2016

(30) Foreign Application Priority Data
Apr. 11, 2013   (DE) .......................... 10 2013 206 388

(51) Int. Cl.
*F16B 13/06*    (2006.01)
(52) U.S. Cl.
CPC .......... *F16B 13/065* (2013.01); *F16B 13/066* (2013.01)
(58) Field of Classification Search
CPC ..... F16B 13/063; F16B 13/065; F16B 13/066

USPC ................. 411/71–73, 54, 49–53, 57.1, 60.1
See application file for complete search history.

(56) References Cited

U.S. PATENT DOCUMENTS

| | | | | |
|---|---|---|---|---|
| 1,291,119 A | * | 1/1919 | Pleister ................. | F16B 13/066 411/65 |
| 4,122,753 A | * | 10/1978 | Kuhlmann ............ | F16B 13/045 411/2 |
| 4,764,055 A | * | 8/1988 | Clark ..................... | E21D 20/025 405/259.2 |
| 5,033,910 A | * | 7/1991 | Wright .................. | F16B 13/066 405/259.3 |
| 5,090,857 A | | 2/1992 | Dunn | |

(Continued)

FOREIGN PATENT DOCUMENTS

| CA | 953958 | 9/1974 |
|---|---|---|
| CN | 2298361 | 11/1998 |

(Continued)

*Primary Examiner* — Ryan J Walters
*Assistant Examiner* — Lawrence Averick
(74) *Attorney, Agent, or Firm* — Davidson, Davidson & Kappel, LLC

(57) ABSTRACT

An anchor (1) that can be secured in a drilled hole (2), with an expansion sleeve (10) for anchoring onto a wall of the drilled hole, and with an anchor bolt (20) that passes through the expansion sleeve and that has an expansion section (38) for widening the expansion sleeve, and it also has a sleeve stop (22) that limits axial movement of the expansion sleeve away from the expansion section (38) is provided. At least one rotary catch (24) is provided which non-rotatably couples the expansion sleeve (10) to the anchor bolt (20), and the expansion sleeve has at least one external thread helix (14) for creating an undercut in the wall of the drilled hole.

8 Claims, 1 Drawing Sheet

(56) References Cited

U.S. PATENT DOCUMENTS

| | | | |
|---|---|---|---|
| 5,176,481 A * | 1/1993 | Schiefer | F16B 13/065 411/55 |
| 5,634,754 A | 6/1997 | Weddendorf | |
| 5,685,678 A * | 11/1997 | Giannuzzi | F16B 13/066 411/55 |
| 5,702,216 A * | 12/1997 | Wu | F16B 13/066 411/32 |
| 5,993,129 A * | 11/1999 | Sato | F16B 13/124 411/43 |
| 6,029,417 A | 2/2000 | Liebhard et al. | |
| 6,238,128 B1 | 5/2001 | Kaibach et al. | |
| 6,524,046 B2 * | 2/2003 | Hsu | F16B 13/065 411/51 |
| 7,744,320 B2 * | 6/2010 | Kobetsky | F16B 13/065 411/60.1 |
| 9,677,586 B2 * | 6/2017 | Trautwein | F16B 13/065 |
| 2006/0263167 A1 | 11/2006 | Linka et al. | |
| 2007/0277976 A1 * | 12/2007 | Kobetsky | F16B 13/065 166/250.01 |
| 2012/0192404 A1 | 8/2012 | Rosenkranz | |
| 2013/0078051 A1 * | 3/2013 | Lison | F16B 13/0858 411/55 |
| 2013/0097845 A1 * | 4/2013 | Schaeffer | F16B 13/065 29/525.01 |
| 2014/0328643 A1 * | 11/2014 | Depietro | F16B 13/065 411/27 |

FOREIGN PATENT DOCUMENTS

| | | |
|---|---|---|
| CN | 2336126 | 9/1999 |
| CN | 102007308 | 4/2011 |
| DE | 7100768 | 4/1971 |
| DE | 2161224 | 6/1973 |
| DE | 2256822 | 6/1974 |
| DE | 29610637 | 9/1996 |
| DE | 29615691 | 10/1996 |
| DE | 10324005 | 12/2004 |
| DE | 10 2006 025268 A1 | 12/2007 |
| DE | 10 2010 063675 | 6/2012 |
| EP | 0514342 | 11/1992 |
| EP | 1072802 | 1/2001 |
| GB | 2311830 | 10/1997 |
| WO | WO 0047905 | 8/2000 |

* cited by examiner

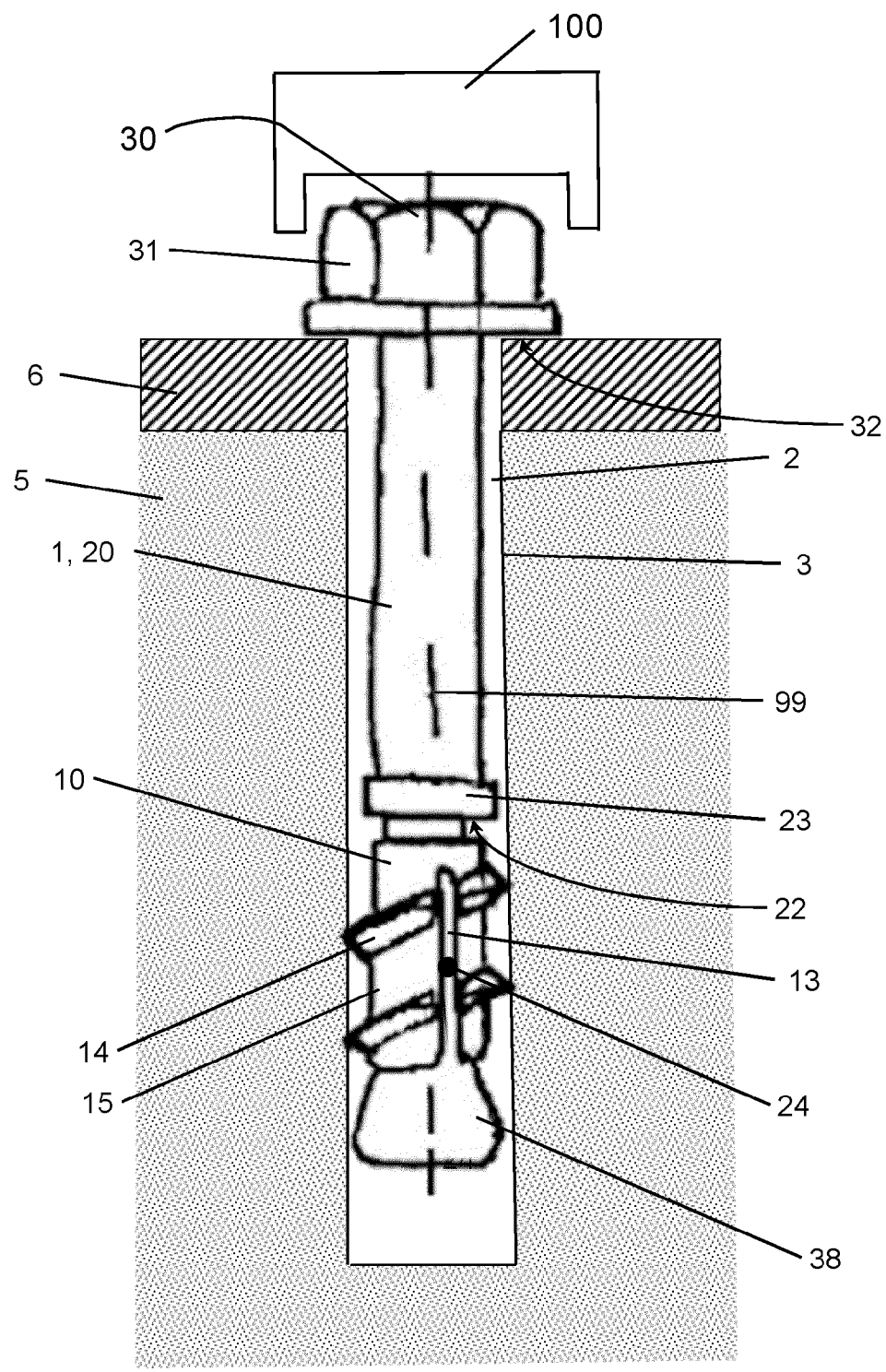

ANCHOR WITH AN EXPANSION SECTION AND A CUTTING THREAD

The invention relates to an anchor, that can be secured in a drilled hole. Such an anchor is configured with an expansion sleeve for anchoring onto a wall of the drilled hole and with an anchor bolt that passes through the expansion sleeve and that has an expansion section for widening the expansion sleeve, and it also has a stop that limits axial movement of the expansion sleeve away from the expansion section.

BACKGROUND

In the realm of fastening technology involving a substrate made of concrete, a distinction is made between insert elements that are cast into the concrete and anchors that are subsequently installed and that are anchored in the already hardened concrete. When it comes to the subsequently installed anchors, numerous types are known such as, for instance, expansion anchors (known, for example, from U.S. Pat. No. 5,176,481 A), screw anchors (known for example, from German patent application DE 10 2010 063675 A1), chemical anchor systems (known, for example, from U.S. Pat. No. 6,029,417 A) and undercut anchors (known, for example, from U.S. Pat. No. 6,238,128 B).

Alternative anchor concepts with a threaded sleeve and an expansion element are disclosed in German patent application DE 10 2006 025268 A1, in U.S. Pat. Appln. Publication No. 2012/0192404 A and in international patent application WO 0047905 A1.

SUMMARY OF THE INVENTION

It is an objective of the present invention to provide an anchor that is particularly reliable and achieves high load ratings while also being easy to install and to produce.

The present invention provides an anchor including—at least one rotary catch which non-rotatably couples the expansion sleeve to the anchor bolt and in that the expansion sleeve has at least one external thread helix for creating an undercut in the wall of the drilled hole.

The invention has the advantage of an expansion anchor in which the expansion sleeve has an external thread helix that, in particular, is so hard that it can cut into the wall of the drilled hole and in which the expansion sleeve is also non-rotatably joined to the anchor bolt. In this manner, the expansion sleeve can be made to rotate in the drilled hole by means of the anchor bolt, and the thread helix of the rotating expansion sleeve, in turn, can create an undercut in the drilled hole. An anchor configured in this way entails several advantages in comparison to conventional anchors:

the external thread helix allows the creation of an undercut that is virtually free of expansion force during the installation, so that higher load ratings can be achieved in comparison to a simple expansion anchor. No special undercut drill bits are needed for creating this undercut, thus minimizing the work involved in the installation.

the introduction of force from the anchor into the substrate takes place almost exclusively on the expansion sleeve by the thread helix and thus deep in the drilled hole. The actual anchoring depth and the effective anchoring depth are very close to each other. Moreover, the free bolt length in the anchor according to the invention is relatively large, so that a high expansibility can be achieved. Finally, thanks to its relatively short thread length, the anchor according to the invention can also be inserted into the drilled hole quite easily.

between the wall of the drilled hole and the sleeve provided with the external thread helix, a screw mechanism can be formed by means of which a rotation of the expansion sleeve that is non-rotatably coupled to the anchor bolt is converted into a combined rotational and axial movement. This combined movement, in turn, can pull the expansion section of the anchor bolt into the expansion sleeve. Therefore, in a very simple manner, the anchor can be installed exclusively by rotating the anchor bolt around its longitudinal axis.

the anchor consists of only two parts and can therefore be manufactured very inexpensively.

Preferably, the expansion sleeve and/or the anchor bolt are made of metal. The external thread helix on the expansion sleeve is configured to be so hard and/or wear-resistant that, as a result, a pronounced undercut can be made in the wall of the drilled hole. For this purpose, the entire expansion sleeve or alternatively only the external thread helix on the expansion sleeve can be hardened.

The anchor bolt tapers in the expansion section in the direction of the sleeve stop, that is to say, the cross section of the anchor bolt increases in the expansion section as the distance from the sleeve stop increases. In the non-expanded initial state, the expansion sleeve is situated between the expansion section and the sleeve stop. In the installed state, the expansion section has been pulled into the expansion sleeve. In particular, the expansion section can be configured conically, at least in certain areas, and can thus be referred to as an expansion cone.

Whenever mention is made here of the axial direction and the radial direction, this can especially refer to the longitudinal axis of the anchor bolt. The rotary catch couples the expansion sleeve to the anchor bolt so that it cannot rotate but can be moved axially. The anchor bolt and/or the expansion sleeve is/are preferably rotated around the longitudinal axis of the anchor bolt, and consequently, the non-rotatable coupling brought about by the rotary catch preferably likewise refers to a rotation around the longitudinal axis of the anchor bolt. Several rotary catches can be provided in order to ensure a highly reliable coupling.

An axial movement of the expansion sleeve relative to the anchor bolt (which, in turn, can preferably be generated by rotating the anchor bolt) causes the expansion section of the anchor bolt to be pulled into the expansion sleeve, a process in which the expansion sleeve can be widened for creating an undercut as well as for anchoring purposes. It is especially preferable for the expansion section to be arranged so as to be closer to the end of the anchor bolt than to the sleeve stop. In particular, the drilled hole can be made in a concrete substrate. The wall of the drilled hole in which the undercut is created can preferably be configured so as to be approximately cylindrical.

The screw mechanism that is formed between the external thread helix and the wall of the drilled hole leads to an axial movement component when the anchor bolt is rotated together with the expansion sleeve relative to the substrate. When the anchor bolt has been axially secured, this results, in turn, in an axial movement of the expansion sleeve relative to the anchor bolt which can pull the expansion section into the expansion sleeve and thus can widen the expansion sleeve for anchoring purposes. In this case, the anchor can be installed particularly easily by means of a rotational movement. In an advantageous embodiment of the invention, the anchor bolt is partially arranged in the drilled hole and the anchor bolt—preferably on the side of the sleeve stop facing away from the expansion area—has a bolt stop that prevents the anchor bolt from being inserted deeper into the drilled hole. Such a bolt stop can very easily and reliably secure the anchor bolt axially, bringing about the above-mentioned effect. The bolt stop is preferably configured so as to be non-rotatable relative to the anchor bolt and/or so as to be configured in one single piece with the anchor bolt. In particular, it can be formed on a ring-shaped shoulder.

It is likewise preferred for the anchor bolt to have a head whose cross section is larger than that of the anchor bolt. The head is preferably arranged on the end of the anchor bolt and/or it is configured in one single piece with it. Such a head can yield an anchor that is very convenient to handle.

Furthermore, a surface of force application can be advantageously provided so as to positively, non-rotatably couple the anchor bolt to an installation tool, and this can further improve the handling. The surface of force application is preferably a polygon, especially an external polygon, for instance, an external hexagon or an internal polygon. The surface of force application can positively, non-rotatably couple an installation tool to the anchor bolt. Consequently, a torque can be transmitted from the installation tool to the anchor bolt and the anchor bolt can be made to rotate in order to cut the external thread helix. The surface of force application can especially be arranged at the end of the anchor bolt that is opposite from the expansion section. In particular, a tangential impact driver can be used as the installation tool.

Advantageously, the surface of force application and/or the bolt stop can be provided on the head. Especially preferably, if available, the surface of force application as well as the bolt stop are provided on the head. According to this variant, the head fulfills several functions, so that it is possible to obtain a reliable anchor whose construction is particularly simple.

It is particularly advantageous for the expansion sleeve to have at least one slit. This can simplify the production. Preferably, several slits, preferably running in parallel, can be provided. As a result, the expansion behavior of the sleeve can be improved. The at least one slit can especially extend in the axial direction and preferably run parallel to the axial direction.

An advantageous embodiment is one in which the rotary catch has a projection that protrudes from the anchor bolt and that engages with the slit. According to this embodiment, the slit can assume a dual function and can serve to establish a rotational coupling as well as to improve the expansion behavior, so that a small amount of effort translates into a high level of functionality. If there are several slits, each one of them, or else just some of the slits, can be associated with a corresponding projection on the bolt functioning as the rotary catches. Several projections on the bolt functioning as the rotary catches can also be associated with an individual slit. The projection that protrudes from the anchor bolt can be, for example, a pin or an edge.

Another advantageous embodiment lies in the fact the rotary catch is in the form of toothing on the sleeve stop that engages with corresponding toothing in the expansion sleeve. The toothing can have one or more teeth.

Yet another advantageous embodiment lies in the fact that the rotary catch is formed by a polygonal configuration of the anchor bolt in the expansion section.

It is particularly preferred that, when the anchor has been installed, the expansion sleeve is in contact with the wall of the drilled hole, also outside of the external thread helix. In particular, at least part of the thread bottom between the external thread helix can be in contact with the wall of the drilled hole. The sleeve that is in contact with the wall of the drilled hole can additionally support the load dissipation, thus allowing very high load ratings, especially since it can counter pressure in the substrate directed towards the anchor bolt.

The invention also relates to a method for installing an anchor according to the invention in a drilled hole, whereby the anchor bolt is inserted into the drilled hole and the anchor bolt is turned around its longitudinal axis.

BRIEF DESCRIPTION OF THE DRAWINGS

The invention will be explained in greater detail below on the basis of preferred embodiments that are schematically shown in the accompanying FIGURE, whereby individual features of the embodiments shown below can be implemented within the scope of the invention, either on their own or in any desired combination. The following is shown schematically:

FIG. 1 a side view of an example of an anchor according to the invention, in a drilled hole.

SUMMARY OF THE INVENTION

FIG. 1 shows an example of an anchor according to the invention. The anchor 1 has an anchor bolt 20 as well as an expansion sleeve 10, whereby the expansion sleeve 10 surrounds the anchor bolt 20 cylindrically. The anchor bolt 20 is inserted through an attachment part 6 into a drilled hole 2 in a substrate 5, preferably in a concrete substrate.

At the lower end of the anchor bolt 20, there is an expansion section 38 in which the cross section of the anchor bolt 20 continuously increases in order to widen the expansion sleeve 10 downwards, that is to say, towards the closer end of the anchor bolt 20. Preferably, the anchor bolt 20 can be configured conically in the expansion section 38. The anchor bolt 20 also has a sleeve stop 22 that limits an axial movement of the expansion sleeve 10 upwards, away from the expansion section 38. The sleeve stop 22 is formed on a ring-shaped shoulder 23 that surrounds the anchor bolt 20.

At its upper end opposite from the expansion section 38, the anchor bolt 20 has a head 30 whose cross section is larger than that of the anchor bolt 20. A surface of force application 31 configured, for instance, as an external hexagon, is provided on the circumference of this head 30. A ring-shaped bolt stop 32 is formed on the underside of the head 30 facing the expansion section 38. This bolt stop 32 is in contact with an attachment part 6 and thus limits the distance by which the anchor bolt can be pushed into the drilled hole 2.

The expansion sleeve 10 has a slit 13 that, starting at the end face of the expansion sleeve 10 facing the expansion section 38, extends into the expansion sleeve 10. The anchor bolt 20 has a rotary catch 24 that couples the expansion sleeve 10 to the anchor bolt 20 in a non-rotatable but axially movable manner. The rotary catch 24 in the example shown is configured as a pin that protrudes radially from the anchor bolt 20 and that engages with the slit 13 of the expansion sleeve 10.

The outside of the expansion sleeve 10 also has an external thread helix 14 that can cut into the wall 3 of the drilled hole 2. The thread helix 14 runs along the anchor bolt 20 around the longitudinal axis 99 of the anchor bolt 20.

In a method according to the invention, the anchor shown in FIG. 1 can be installed as follows:

First of all, the drilled hole 2 is created in the substrate 5. Then the anchor bolt 20, with its expansion section 38 leading, is inserted through a hole in the attachment part 6 and into the drilled hole 2, and screwed or hammered further until the bolt stop 32 formed on the head 30 makes contact with the attachment part 6, and until the latter, in turn, makes contact with the substrate 5. The sleeve stop 22 prevents the expansion sleeve 10 from moving on the anchor bolt 10 too far towards the head 30.

The anchor bolt 20 is then turned around its longitudinal axis 99 in order to tighten the anchor 1, and this is done by an installation tool 100 that is applied onto the surface of force application 31 on the head 30. The installation tool can be, for instance, a wrench or a tangential impact driver. Owing to the rotary catch 24, the expansion sleeve 10 turns along with the anchor bolt 20 and the external thread helix 14 arranged on the expansion sleeve 10 starts to cut a mating thread into the wall 3 of the drilled hole.

While the thread is being cut, the expansion sleeve 10 moves downwards in the drilled hole 2 towards the bottom of the hole. Since the anchor bolt 20 is axially affixed by the bolt stop 32, it cannot follow this axial movement of the expansion sleeve 10. The result is an axial movement of the expansion sleeve 10 relative to the anchor bolt 20, during which the expansion section 38 of the anchor bolt 20 is pulled into the expansion sleeve 10 so that it radially widens the expansion sleeve 10. Due to this radial widening of the expansion sleeve 10, it can be ensured that the expansion sleeve 10 cuts a pronounced undercut into the wall 3 of the drilled hole. At the same time, the attachment part 6 is pressed firmly against the substrate 5.

As soon as the thread bottom 15 of the expansion sleeve 10, which is formed between the thread helix 14 of the expansion sleeve 10, is in contact with the wall 3 of the drilled hole, the torque increases dramatically. This can be utilized as an indication that the assembly procedure has been completed.

The invention claimed is:

1. An anchor securable in a drilled hole, comprising:
   an expansion sleeve for anchoring onto a wall of the drilled hole, the expansion sleeve having at least one external thread helix for creating an undercut in the wall of the drilled hole, an outer edge of the external thread helix defining an outermost radial boundary of the expansion sleeve;
   an anchor bolt passing through the expansion sleeve and having an expansion section for widening the expansion sleeve, and also a sleeve stop limiting axial movement of the expansion sleeve away from the expansion section; and
   at least one rotary catch non-rotatably coupling the expansion sleeve to the anchor bolt.

2. The anchor as recited in claim 1 wherein the anchor bolt is partially arranged in the drilled hole and the anchor bolt, on a side of the sleeve stop facing away from the expansion area, has a bolt stop preventing the anchor bolt from being inserted deeper into the drilled hole.

3. The anchor as recited in claim 2 wherein the anchor bolt has a head and the bolt stop is provided on the head.

4. The anchor as recited in claim 1 wherein the anchor bolt has a head whose cross section is larger than that of the rest of the anchor bolt, the anchor bolt having a surface of force application so as to positively, non-rotatably couple the anchor bolt to an installation tool.

5. The anchor as recited in claim 4 wherein the head has the surface of force application.

6. The anchor as recited in claim 4 wherein the surface of force application is an external polygon.

7. The anchor as recited in claim 1 wherein the expansion sleeve has at least one slit and the rotary catch has a projection that protrudes from the anchor bolt and engages with the slit, or the rotary catch is in the form of toothing on the sleeve stop engaging with corresponding toothing in the expansion sleeve, or the rotary catch is formed by a polygonal configuration of the anchor bolt in the expansion section.

8. The anchor as recited in claim 1 wherein the expansion sleeve is in contact with the wall of the drilled hole, also outside of the external thread helix.

\* \* \* \* \*